(12) United States Patent
Wu et al.

(10) Patent No.: US 12,473,407 B2
(45) Date of Patent: Nov. 18, 2025

(54) ANTI-FOULING POLYURETHANE THIN FILM WITH HIGH ELASTICITY AND HIGH TRANSPARENCY, PREPARATION METHOD AND USE THEREOF

(71) Applicant: Guangzhou University, Guangdong (CN)

(72) Inventors: Xu Wu, Guangdong (CN); Minhuan Liu, Guangdong (CN); Zhengping Wang, Guangdong (CN); Xiubin Xu, Guangdong (CN); Danfeng Yu, Guangdong (CN); Taoyan Mao, Guangdong (CN)

(73) Assignee: Guangzhou University, Guangzhou (CN)

( * ) Notice: Subject to any disclaimer, the term of this patent is extended or adjusted under 35 U.S.C. 154(b) by 585 days.

(21) Appl. No.: 17/571,791

(22) Filed: Jan. 10, 2022

(65) Prior Publication Data
US 2022/0127428 A1    Apr. 28, 2022

Related U.S. Application Data

(63) Continuation of application No. PCT/CN2020/102914, filed on Jul. 20, 2020.

(30) Foreign Application Priority Data

Jul. 19, 2019  (CN) .................. 201910655864.X

(51) Int. Cl.
| | |
|---|---|
| *C08J 5/18* | (2006.01) |
| *C08G 18/12* | (2006.01) |
| *C08G 18/24* | (2006.01) |
| *C08G 18/28* | (2006.01) |
| *C08G 18/32* | (2006.01) |
| *C08G 18/34* | (2006.01) |
| *C08G 18/48* | (2006.01) |
| *C08G 18/66* | (2006.01) |
| *C08G 18/75* | (2006.01) |

(52) U.S. Cl.
CPC .............. *C08J 5/18* (2013.01); *C08G 18/12* (2013.01); *C08G 18/242* (2013.01); *C08G 18/2885* (2013.01); *C08G 18/3206* (2013.01); *C08G 18/348* (2013.01); *C08G 18/4854* (2013.01); *C08G 18/6677* (2013.01); *C08G 18/6692* (2013.01); *C08G 18/755* (2013.01); *C08J 2375/08* (2013.01)

(58) Field of Classification Search
None
See application file for complete search history.

(56) References Cited

U.S. PATENT DOCUMENTS

| | | | |
|---|---|---|---|
| 2012/0108741 A1 | 5/2012 | Wu et al. | |
| 2014/0350177 A1* | 11/2014 | Pajerski | C08G 18/283 524/590 |
| 2015/0232695 A1* | 8/2015 | Li | C09D 175/06 428/335 |
| 2016/0096936 A1 | 4/2016 | Swenor et al. | |
| 2016/0310641 A1 | 10/2016 | Santerre et al. | |
| 2017/0114248 A1* | 4/2017 | Duan | C08G 83/001 |
| 2017/0158874 A1 | 6/2017 | Grigat et al. | |

FOREIGN PATENT DOCUMENTS

| | | |
|---|---|---|
| CN | 102585664 A | 7/2012 |
| CN | 105885010 A | 8/2016 |
| CN | 106336498 A | 1/2017 |
| CN | 108034223 A | 5/2018 |
| CN | 109081898 A | 12/2018 |
| CN | 109824849 A | 5/2019 |
| CN | 110423454 A | 11/2019 |
| WO | 2019044843 A1 | 3/2019 |

OTHER PUBLICATIONS

Zu, Yanhua, Synthesis and Properties of the Fluorine and Silicon Modified Polyurethane Self-assembly Films, May 2012, pp. I-V and 1-50.
Wen, Jiating et al., Synthesis and Characterization of a Novel Fluorinated Waterborne Polyurethane, Progress in Organic Coatings, 2019, pp. 291-300, vol. 131, Elsevier B.V.
International search report of PCT Patent Application No. PCT/CN2020/102914 issued on Sep. 28, 2020.

* cited by examiner

*Primary Examiner* — Sheeba Ahmed
(74) *Attorney, Agent, or Firm* — LOZA & LOZA, LLP; Michael Fedrick

(57) ABSTRACT

The invention discloses an anti-fouling polyurethane thin film with high elasticity and high transparency, a preparation method and use thereof. The raw materials of the polyurethane thin film include the following active ingredients by mass fractions: 30% to 40% of a hard segment monomer, 40% to 50% of a soft segment monomer, 3% to 6% of a hydrophilic monomer, 0% to 3% of a crosslinking monomer, 0% to 5% of a small molecular chain extender, and 10% to 15% of a compound with low surface energy. A chemically and physically double-crosslinked anti-fouling polyurethane is synthesized through a polycondensation reaction. This thin film exhibits superior low adhesion and anti-fouling properties, and can achieve the coexistence of both low adhesion and stretchability at the same time.

7 Claims, 4 Drawing Sheets

ANTI-FOULING POLYURETHANE THIN FILM WITH HIGH ELASTICITY AND HIGH TRANSPARENCY, PREPARATION METHOD AND USE THEREOF

CROSS REFERENCE TO RELATED APPLICATIONS

The present application is a Continuation Application of PCT Application No. PCT/CN2020/102914 filed on Jul. 20, 2020, which claims the benefit of Chinese Patent Application No. 201910655864. X filed on Jul. 19, 2019. All the above are hereby incorporated by reference in their entirety.

TECHNICAL FIELD

The invention belongs to the fields of novel high molecular functional materials, high-performance high molecular structural materials, and polymer thin film materials, and particularly relates to an anti-fouling polyurethane thin film with high elasticity and high transparency, a preparation method and a use thereof.

BACKGROUND

Revolutionary progress in various technical fields has proposed a foreseeable future for us to treat human diseases or enhance capabilities, by incorporating synthetic materials and devices, including synthetic skin, electronic muscles, and wearable devices etc. into human bodies. Synthetic materials support human development in many aspects such as the advancement of devices and the like, and will also be the basis for humans to realize new ideas. During the development of new materials, distinguished from the existing hard materials and devices, tensile properties become emerging and necessary material properties. However, as one of the important properties of material surface, realizing the coexistence of low adhesion and stretchability of the material has become a problem.

In the past decades, a lot of research work has been devoted to the design and preparation of low-adhesion bionic surfaces. The low-adhesion surface may be hydrophobic and oleophobic, and therefore may reduce fouling, resistance, corrosion, icing, bacterial infection, etc. These surfaces are inspired by lotus leaf and nepenthes, and can be roughly divided into two categories based on the bionic structure. The lotus leaf bionic super-amphiphobic surface has micro air bag embedded in the micro-nano rough surface structure with low surface energy, and the contact angles to water and oil both exceed 150 degrees. The surface of the nepenthes bionic liquid membrane has a low-surface energy liquid embedded in the modified porous material. Although the contact angles do not exceed 120 degrees, it can still be maintained clean after contacting with various liquids. These two types of bionic materials can be regarded as semi-gas and semi-liquid materials, which are still difficult to be applied in practice due to cumbersome preparation, and structural problems such as poor durability and transparency etc. It is worth noting that these problems are not necessarily regarded as difficulties in nature to be solved through natural selection and evolution. The fluorine-containing compounds with the lowest surface energy does not exist within an organism, however, synthetic materials can have some changes in composition to use these fluorine-containing compounds to achieve the desired low adhesion performance. At present, the most widely used low-adhesion surface polytetrafluoroethylene (PTFE) has a uniform and flat structure and a low contact angle, but it does not adhere to various liquids and has successfully solved various kinds of problem that may be caused by adhesive ability in different practical applications.

However, the inherent structural problems of super-amphiphobic materials, liquid membrane materials, and polytetrafluoroethylene materials all restrict their improvement of tensile properties. Since the micro-nano surface embedded with micro-air bag is easily damaged during material deformation, there are still no super-amphiphobic materials with intrinsic tensile properties in the current literatures and reports. There is only a small amount of work on spraying hydrophobic silicon balls on elastic substrates such as rubber or resin etc. for trying to control the roughness of the stretched and damaged surface. The surface composed of these elastic substrates can only be hydrophobic and has poor transparency. For liquid membrane materials, stretching of the material will damage the continuity of the surface functional liquid membrane, and a slight stretching of 10% will seriously affect the adhesion and transparency. Polytetrafluoroethylene materials are difficult to be modified on elasticity and functionality because of their insolubility and infusibility, and the high viscosity after melting even makes polytetrafluoroethylene difficult to make membrane.

SUMMARY OF THE INVENTION

In order to overcome the above-mentioned shortcomings and deficiencies of the prior art, the primary purpose of the present invention is to provide an anti-fouling polyurethane thin film with high elasticity and high transparency.

Another purpose of the present invention is to provide a method for preparing the above-mentioned anti-fouling polyurethane thin film with high elasticity and high transparency.

Another purpose of the present invention is to provide a use of the above-mentioned anti-fouling polyurethane thin film with high elasticity and high transparency.

The purposes of the present invention are achieved through the following solutions:

An anti-fouling polyurethane thin film with high elasticity and high transparency whose raw materials for preparation comprise the following active ingredients by mass fractions:

| | |
|---|---|
| hard segment monomer | 30% to 40%; |
| soft segment monomer | 40% to 50%; |
| hydrophilic monomer | 3% to 6%; |
| crosslinking monomer | 0% to 3%; |
| small molecular chain extender | 0% to 5%; and |
| compound with low surface energy | 10% to 15%, | wherein the mass fraction refers to the mass fraction of each active ingredient in the total active ingredients.

The hard segment monomer is at least one of toluene-2, 4-diisocyanate (TDI), diphenylmethane diisocyanate (MDI), hexamethylene diisocyanate (HDI), dicyclohexylmethane diisocyanate (HMDI), 1,4-cyclohexane diisocyanate and isophorone diisocyanate (IPDI); preferably isophorone diisocyanate (IPDI).

The soft segment monomer is at least one of polyester glycol and polyether glycol; preferably at least one of polytetrahydrofuran ether glycol, and poly(adipic acid)-(2-methyl-1,3-propanediol)-(1,4-butanediol) ester diols.

The hydrophilic monomer is at least one of sodium 1,4-butanediol-2-sulfonate, sodium 1,2-propanediol-3-sulfonate, sodium ethylenediamino ethanesulfonate, 2,4- diamino benzenesulfonic acid, dimethylol propionic acid and dimethylol butyric acid; preferably dimethylol butyric acid.

The crosslinking monomer is at least one of glycerol, triisopropanolamine, pentaerythritol, and trimethylol propane; preferably trimethylol propane.

The small molecular chain extender is at least one of 1,4-butanediol, ethylene glycol, diethylene glycol, and ethylene diamine; preferably at least one of 1,4-butanediol and ethylene glycol.

The compound with low surface energy is a monohydroxyalkyl organic fluorine; preferably, the monohydroxyalkyl organic fluorine is at least one of 3,3,4,4,5,5,6,6,7,7,8,8,8-tridecafluoro-1-octanol, 1H, 1H, 9H-hexadecafluoro-1-nonanol, and 2,2,3,3,4,4,5,5,6,6,7,7,8,8,8-pentadecafluoro-1-octanol.

The raw materials for preparation further include a catalyst, and the catalyst is dibutyl tin dilaurate, the amount of which is 0 to 0.05% of the total mass of the active ingredients in the raw materials for preparation.

A method for preparing the above-mentioned anti-fouling polyurethane thin film with high elasticity and high transparency includes the following steps:

(1) mixing a soft segment monomer, a hydrophilic monomer and a crosslinking monomer uniformly, adding a hard segment monomer and a catalyst under stirring condition, heating to 70 to 85° C., reacting for 2 to 5 hours, adding a compound with low surface energy, and continuing to react for 2 to 5 hours, to obtain a prepolymer;

(2) cooling the obtained prepolymer, adding triethylamine to neutralize the prepolymer, and adding water to disperse and emulsify the prepolymer, after the prepolymer is dispersed and emulsified by water, adding a small molecular chain extender for chain extension to obtain a polyurethane aqueous dispersion; and (3) curing the obtained polyurethane aqueous dispersion to obtain an anti-fouling polyurethane thin film with high elasticity and high transparency.

The chain extension in step (2) refers to reacting at room temperature for 0.5 to 2 hours for chain extension;

The solid content of the polyurethane aqueous dispersion in step (2) is 20% to 40%, and preferably 30%;

The curing in step (3) refers to baking at 20 to 90° C. for 1 to 24 hours.

The above-described anti-fouling polyurethane thin film with high elasticity and high transparency is used as a self-cleaning coating layer for substrates (such as glass, wood, metal, ceramics, leather, polyester thin film, etc.), especially the self-cleaning coating layer for flexible electronic display screen, wearable sensors and other soft plastics.

Relative to the prior art, the present invention has the following advantages and beneficial effects:

The invention synthesizes a chemically and physically double-crosslinked anti-fouling polyurethane through a polycondensation reaction. The organic fluorine chain segment in the polyurethane molecule can provide low surface energy required for anti-adhesion performance, and the hydrophilic groups in the chain segment provide the polymer molecules with better water solubility, which can reduce the use of organic solvents. The polyurethane aqueous dispersion can not only be used as an elastic anti-fouling thin film, but also be coated on a variety of substrates and used as a self-cleaning coating layer. The polyurethane thin film uses the raw materials of lower price, uses water as the main dispersion medium, is environmentally friendly, and has good transparency, remarkable anti-adhesion, and excellent mechanical properties, allowing it to have broad application prospects and considerable economic and social benefits.

The thin films prepared by the present invention can all exhibit superior low adhesion and anti-fouling performance, and have a slippery hand feeling and style. The low adhesion performance is expressed as low adhesion to water, diiodomethane, hexadecane and the like liquids with different surface tensions (the surface tensions of the three liquids are 72.8, 50.8 and 27.5 mN/m respectively), as well as low adhesion to vegetable oils, pump oils and the like liquids with different viscosities. The liquids do not adhere to the thin film at all and slip off the thin film without leaving a trace. Furthermore, when the thin film is in a stretched state (elongation rate≤1800%), the liquid can still slip off the thin film without leaving a trace, indicating that the thin film can achieve a coexistence of both low adhesion and stretchability at the same time.

DETAILED DESCRIPTION

Figure 1:
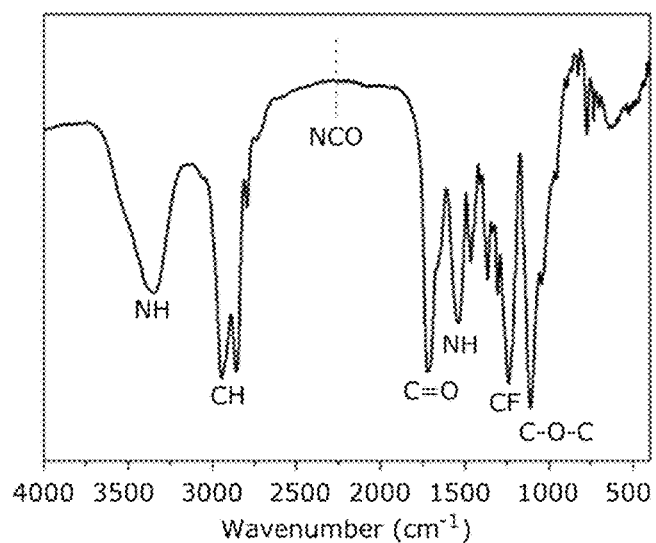
FIG. 1 is a Fourier infrared spectrogram of the polyurethane material prepared in Example 1.

The present invention will be further described in detail below in conjunction with the examples and the appended drawings, but the embodiments of the present invention are not limited to this.

The reagents used in the examples can be conventionally purchased from the market unless otherwise specified.

The formulas of the raw materials for the anti-fouling polyurethane thin films with high elasticity and high transparency in Examples 1 to 5 are shown in Table 1 and Table 2, respectively:

TABLE 1

Formulas of the raw materials for the anti-fouling polyurethane materials with high elasticity and high transparency in Examples 1 to 3

| Ingredients | Example 1 | Example 2 | Example 3 |
|---|---|---|---|
| Isophorone diisocyanate/g | 12.00 | 12.00 | 12.00 |
| Polytetrahydrofuran ether glycol/g (molecular weight 1000) | 15.40 | 15.40 | 15.40 |

TABLE 1-continued

Formulas of the raw materials for the anti-fouling polyurethane materials with high elasticity and high transparency in Examples 1 to 3

| Ingredients | Example 1 | Example 2 | Example 3 |
|---|---|---|---|
| Trimethylol propane/g | 0.70 | 0.70 | 0.70 |
| Dimethylol butyric acid/g | 1.60 | 1.60 | 1.60 |
| 3,3,4,4,5,5,6,6,7,7,8,8,8-Tridecafluoro-1-octanol/g | 3.50 | 4.20 | 5.40 |
| 1,4-butanediol/g | 0.29 | 0.15 | 0.00 |
| Dibutyltin dilaurate | 0.01 | 0.01 | 0.01 |

TABLE 2

Formulas of the raw materials of the anti-fouling polyurethane materials with high elasticity and high transparency in Examples 4 to 5

| Ingredients | Example 4 | Example 5 |
|---|---|---|
| Isophorone diisocyanate/g | 12.00 | 12.00 |
| Polytetrahydrofuran ether glycol/g (molecular weight 1000) | 15.40 | 15.40 |
| Trimethylol propane/g | 0.70 | 0.70 |
| Dimethylol butyric acid/g | 1.60 | 1.60 |
| 3,3,4,4,5,5,6,6,7,7,8,8,8-Tridecafluoro-1-octanol/g | 3.50 | 4.20 |
| Ethylene glycol/g | 0.20 | 0.10 |
| Dibutyltin dilaurate | 0.01 | 0.01 |

The preparation method of the anti-fouling polyurethane thin film with high elasticity and high transparency includes the following steps:

Putting a soft segment monomer, a hydrophilic monomer and a crosslinking monomer into a four-necked flask, mixing homogeneously, adding a hard segment monomer under stirring condition, adding a catalyst dibutyltin dilaurate, and raising the temperature of the reaction system to 80° C. to react for 2 hours under such condition; then adding monohydroxy alkyl organic fluorine to continue the reaction for 2 hours. After the reaction was completed and the system was cooled to 40° C., triethylamine was added to neutralize the prepolymer. After the neutralization was completed, water was added to disperse and emulsify the prepolymer. After the prepolymer was dispersed and emulsified uniformly, an aqueous solution of a small molecular chain extender for chain extension was added for chain extension, to obtain a polyurethane aqueous dispersion with a solid content of 30%; then the polyurethane aqueous dispersion with a solid content of 30% was poured into a glass or polytetrafluoroethylene mold, for baking at a temperature of 50° C. for 24 hours, to obtain an anti-fouling thin film with low adhesion.

The Fourier infrared spectrogram of the polyurethane material prepared in Example 1 is shown in FIG. 1. It can be seen from FIG. 1 that the isocyanic acid radical in the isophorone diisocyanate raw material was exhausted, and the expected polycondensation reaction was carried out completely, wherein all the characteristic peaks corresponding to the structure of the expected product can be seen from the figure.

All the characteristic peaks corresponding to the structure of the expected product can also be seen in the Fourier infrared spectrograms of the polyurethane materials prepared in Examples 2 to 5.

The determination results for the conventional determination items of the thin films of the above-described examples, for example, thin film appearance, mechanical strength, surface-drying time and hard-drying time, and Shore hardness can all meet the technical indexes with the thin film being colorless and transparent (transparency of 95% or more), and having higher tensile stress (≥25 MPa) and moderate hardness (~80 HA), which are not further elaborated.

Examples for Use (1) Transparency of the Thin Film

Figure 2:
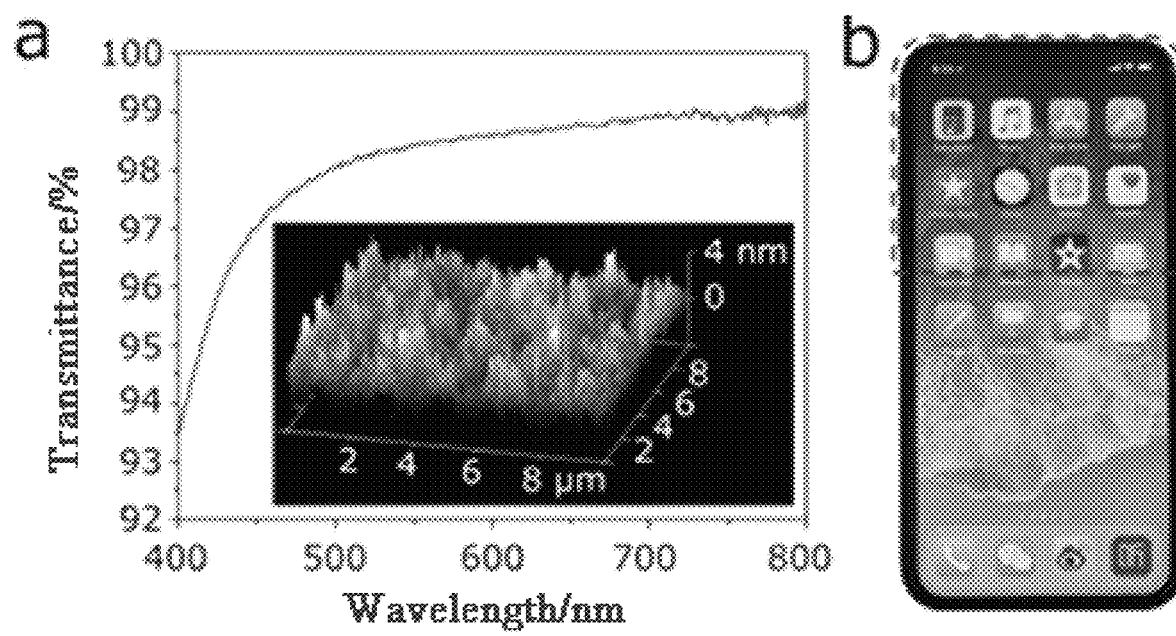
FIG. 2 is a diagram showing the results for transparency experiment of the polyurethane thin film prepared in Example 2, wherein "a" represents the ultraviolet transmittance of the thin film and the atomic force microscope photograph of the thin film, and "b" represents the photograph of the thin film placed on a mobile phone.

A transmittance test and atomic force microscope observation were performed on the polyurethane thin film prepared in Example 2. The result was shown in portion a in FIG. 2, and it can be seen from portion a in FIG. 2 that the thin film had excellent transparency with UV transmittance of up to 97% at a visible light wavelength of 500 nm. The roughness of the thin film was only 4 nm, indicating that the surface of the thin film was relatively smooth. At the same time, the polyurethane thin film prepared in Example 2 was attached to a mobile phone screen, and its photograph was shown in portion b in FIG. 2. As can be seen from portion b in FIG. 2, the visibility of the screen was hardly changed, the images and text were clearly visible, and the thixotropic sensing capability of the mobile phone was also normal. Therefore, it can be seen from FIG. 2 that the polyurethane thin film prepared by the present invention had excellent transparency.

The polyurethane thin film prepared in Example 4 had an UV transmittance of 98% at a visible light wavelength of 500 nm, and the roughness of the thin film was only 3 to 4 nm; and the polyurethane thin film prepared in Example 5 had an UV transmittance of 98% at a visible light wavelength of 500 nm, and the roughness of the thin film was only 3 to 4 nm.

(2) Mechanically Tensile Properties of the Polyurethane Thin Film

Figure 3:
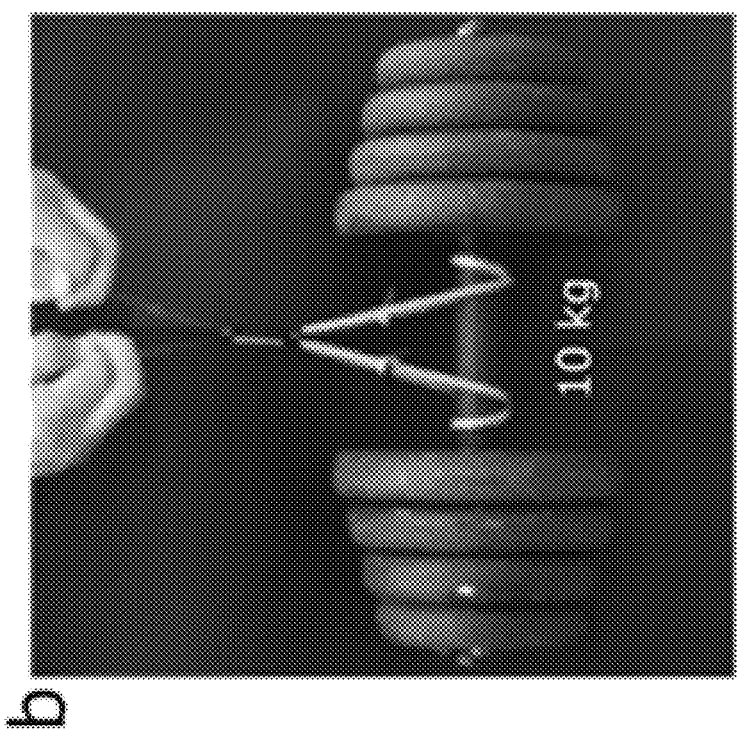
FIG. 3 is a graph showing the results for the mechanically tensile properties of the polyurethane thin film prepared in Example 3, wherein "a" represents the tensile curve of the thin film at different tensile rates, and "b" represents a photograph of the thin film with a 10 kg dumbbell suspended.
Figure 3:
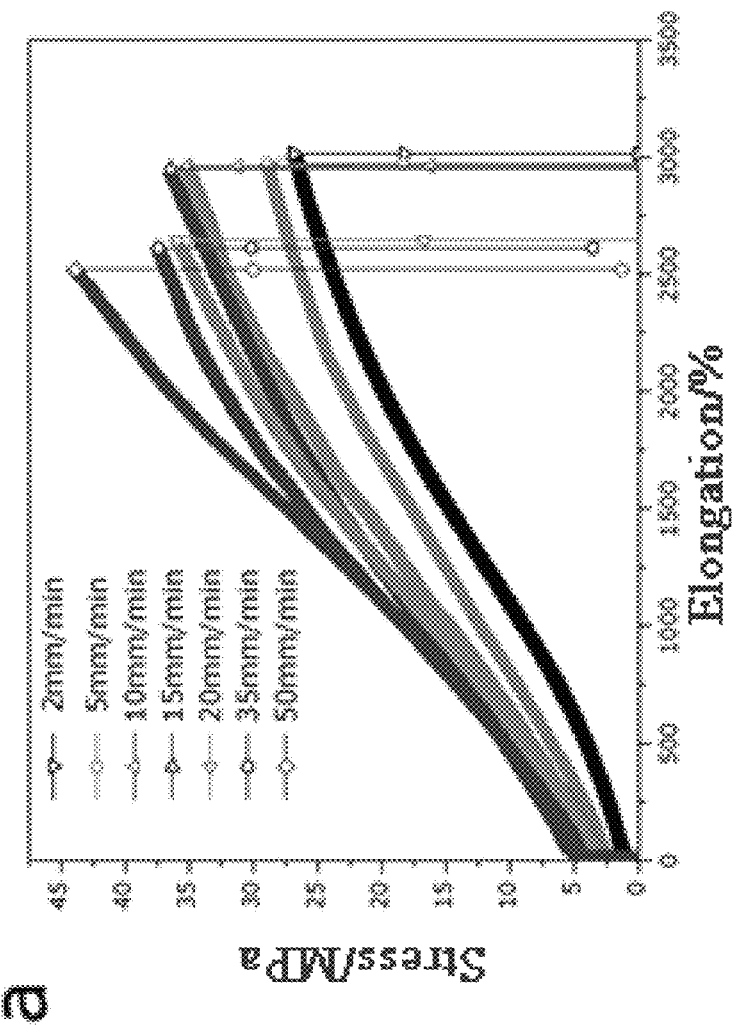

The tensile curves of the polyurethane thin film prepared in Example 3 (the thin film having a thickness of 0.5 mm, a gauge length of 5 mm, and a width of 10 mm) at different stretching rates (2 to 15 mm/min) were shown in portion a in FIG. 3. It can be seen from portion a in FIG. 3 that when the stretching rate is 2 to 15 mm/min, the elongation of the thin film can reach 3100±150%. The breaking strength of the thin film can be up to 44 MPa, which may hung a 10 kg dumbbell (shown as in portion b in FIG. 3), indicating that the mechanical strength of the thin film is superior.

The mechanical properties of the polyurethane thin films prepared in Example 4 and Example 5 were examined in the same manners as that in Example 3. It can be seen that when the stretching rate was 2 to 15 mm/min, the elongation of the thin film prepared in Example 4 can reach 3000±200%, and the breaking strength of the thin film can be up to 45 MPa. When the stretching rate is 2 to 15 mm/min, the elongation rate of the thin film prepared in Example 5 can reach 3100±200%, and the breaking strength of the thin film can be up to 43 MPa.

(3) Low Adhesion and Antifouling Performance of the Polyurethane Thin Film

Figure 4:
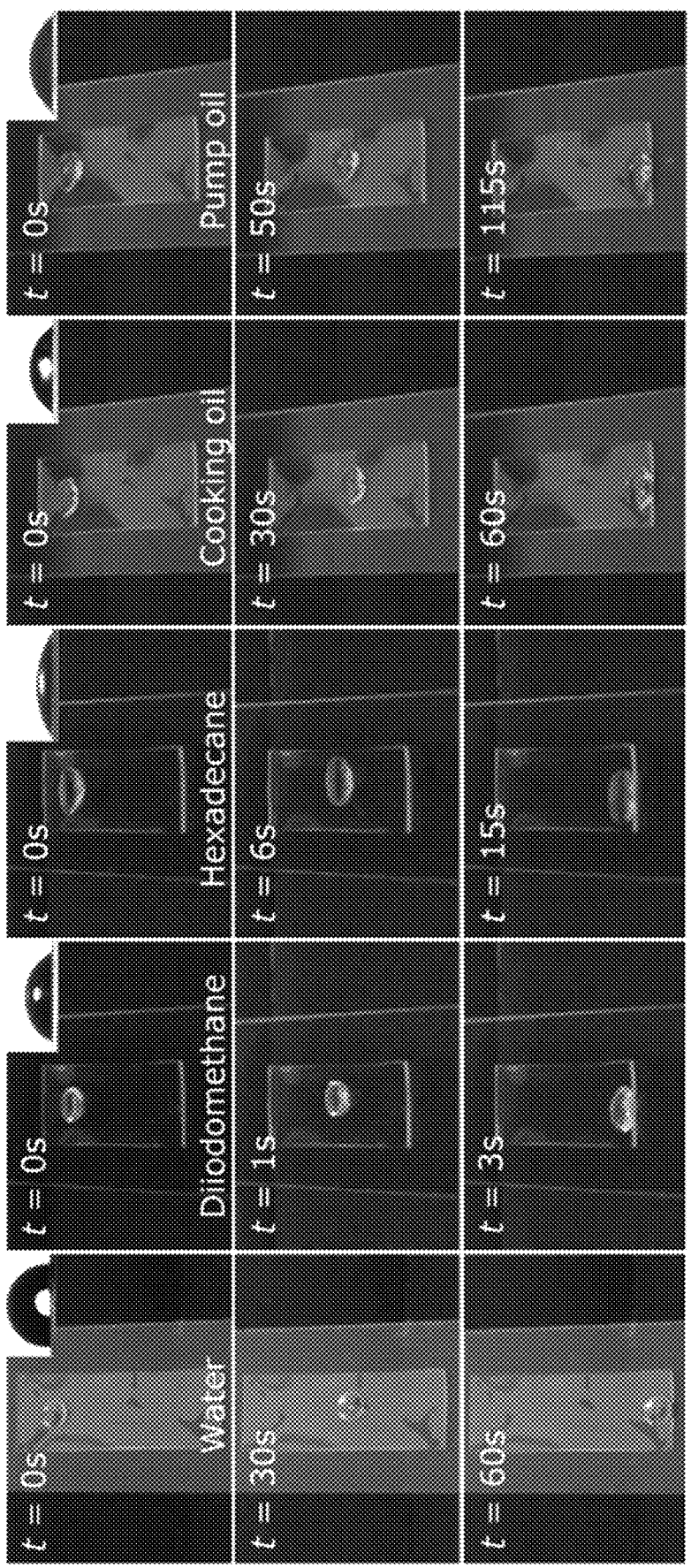
FIG. 4 is a diagram showing the adhesion states of various representative liquids on the polyurethane thin film prepared in Example 1.

Five representative liquids of water, diiodomethane, hexadecane, vegetable oil, and pump oil were respectively added dropwise to the polyurethane thin films prepared in Example 1, and then these polyuretheane thin films were correspondingly inclined in angles of 50°, 12°, 13°, 18° and 19° respectively. The adhesion state of each representative liquid at different times was shown in FIG. 4. It can be seen from FIG. 4 that when the thin film is inclined at different angles, each representative liquid slides off the thin film one after another without leaving any trace, indicating that the thin film had superior low adhesion and anti-fouling properties to various liquids.

Figure 5:
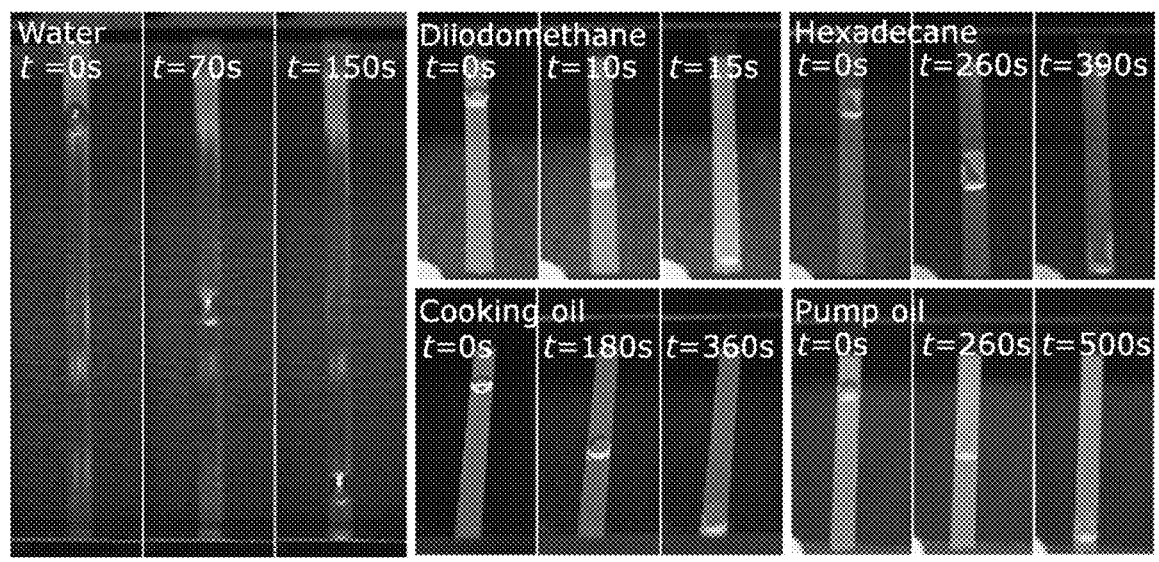
FIG. 5 is a diagram showing the adhesion states of various representative liquids on the polyurethane thin film prepared in Example 1 with an elongation rate of 1800%.

The polyurethane thin films prepared in Example 1 were stretched to 1800%, and then 5 representative liquids of water, diiodomethane, hexadecane, vegetable oil, and pump oil were correspondingly added dropwise to the stretched thin films inclined at 90°, 18°, 19°, 28°, and 31°. The adhesion state of each representative liquid on the thin film with an elongation rate of 1800% at different times was shown in FIG. 5. It can be seen from FIG. 5 that when the thin film is stretched to 1800%, each representative liquid can still slip from the inclined thin film without leaving any trace, indicating that the thin film can achieve the coexistence of both low adhesion and stretchability. The stretched thin film had superior low adhesion, with its lyophobicity having good mechanical stability.

(4) Resilience Performance of the Polyurethane Thin Film

Figure 6:
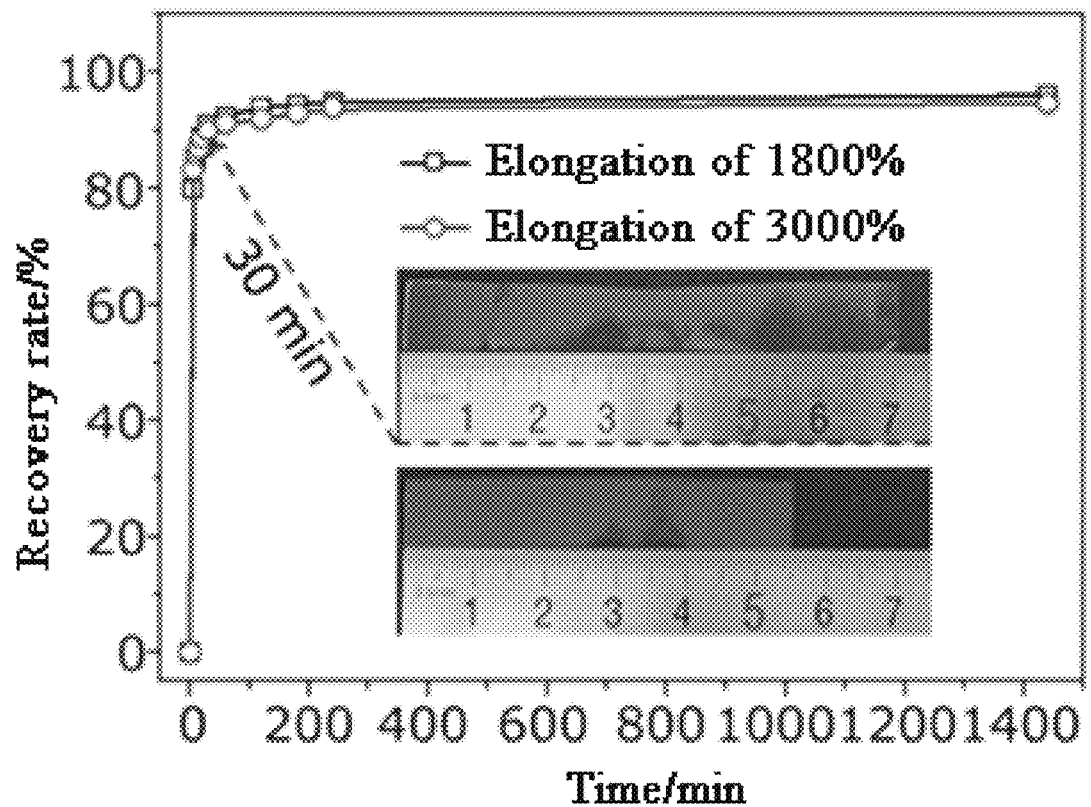
FIG. 6 is a graph showing the recovery rate of the polyurethane thin film prepared in Example 3 when stretched to 1800% and 3000% at different times.

The polyurethane thin films (10 (mm, width)*55 (mm, length)*5 (mm, thickness)) prepared in Example 3 were stretched to 3000% and 1800%, relaxed, and placed naturally at room temperature. The free recovery processes of the thin films stretched to 1800% and 3000%, the images of the thin films naturally released for 30 minutes after being stretched to 3000%, and the images of the original thin films were shown in FIG. 6. It can be seen from FIG. 6 that, the recovery rates of the thin films were both beyond 80% after 5 minutes, both beyond 90% after 30 minutes of recovery, and both reached 95% after 24 hours of recovery, which shows that the mechanical properties of the thin film were reversible.

The formula for calculating the recovery rate of the thin film was:

$$R_r = 1 - \varepsilon_{(t)}/\varepsilon_{max}$$

Wherein, $\varepsilon_{max}$ is the elongation rate of the thin film before it is naturally released; and $\varepsilon_{(t)}$ is the real-time elongation rate of the thin film after it is naturally released.

Likewise, the polyurethane thin films (10 (mm, width)*55 (mm, length)*5 (mm, thickness)) prepared in Example 4 were stretched to 3000% and 1800%, relaxed, and placed naturally at room temperature. The recovery rates of the thin films stretched to 3000% and 1800% were both beyond 80% after 5 minutes, beyond 90% after 30 minutes of recovery, and both reached 95% after 24 hours of recovery. The polyurethane thin films (10 (mm, width)*55 (mm, length)*5 (mm, thickness)) prepared in Example 5 were stretched to 3000% and 1800%, relaxed, and placed naturally at room temperature. The recovery rates of the thin films stretched to 3000% and 1800% were both beyond 80% after 5 minutes, both beyond 90% after 30 minutes of recovery, and both reached 95% after 24 hours of recovery, which shows that the mechanical properties of the thin film were reversible.

The above-mentioned examples are preferred embodiments of the present invention, but the embodiments of the present invention are not limited by the above-mentioned examples, and any other changes, modifications, substitutions, combinations, and simplifications made without departing from the spirit and principle of the present invention should all be equivalent replacement modes, and they are all included within the protection scope of the present invention.

The invention claimed is:

1. An anti-fouling polyurethane film, characterized in that it has raw materials comprising the following active ingredients by mass fractions:

| | |
|---|---|
| a hard segment monomer | 30% to 40%; |
| a soft segment monomer | 40% to 50%; |
| a hydrophilic monomer | 3% to 6%; |
| a crosslinking monomer | 0% to 3%; |
| a small molecular chain extender | 0% to 5%; and |
| a compound with low surface energy | 10% to 15%, | wherein the mass fraction refers to the mass fraction of each active ingredient in the total active ingredients;

the first segment monomer is at least one of toluene-2,4-diisocyanate, diphenylmethane diisocyanate, hexamethylene diisocyanate, dicyclohexylmethane diisocyanate, 1,4-cyclohexane diisocyanate or isophorone diisocyanate;

the second segment monomer is at least one of polyester glycol or polyether glycol;

the hydrophilic monomer is at least one of sodium 1,4-butanediol-2-sulfonate, sodium 1,2-propanediol-3-sulfonate, sodium ethylenediaminoethanesulfonate, 2,4-diaminobenzenesulfonic acid, dimethylolpropionic acid or dimethylolbutyric acid;

the crosslinking monomer is at least one of glycerol, triisopropanolamine, pentaerythritol, or trimethylolpropane;

the molecule chain extender is at least one of 1,4-butanediol, ethylene glycol, diethylene glycol, or ethylenediamine; and the surface energy compound is a monohydroxyalkyl organic fluorine.

2. The anti-fouling polyurethane film according to claim 1, characterized in that:

the first segment monomer is isophorone diisocyanate;

the second segment monomer is at least one of polytetrahydrofuran ether glycol or poly(adipic acid)-(2-methyl-1,3-propanediol)-(1,4-butanediol) ester diols;

the hydrophilic monomer is dimethylolbutyric acid;

the crosslinking monomer is trimethylolpropane;

the molecule chain extender is at least one of 1,4-butanediol or ethylene glycol; and the surface energy compound is at least one of 3,3,4,4,5,5,6,6,7,7,8,8,8-tridecafluoro-1-octanol, 1H, 1H, 9H-hexadecafluoro-1-nonanol, or 2,2,3,3,4,4,5,5,6,6,7,7,8,8,8-pentafluoro-1-octanol.

3. The anti-fouling polyurethane film according to claim 1, characterized in that the raw materials further include a catalyst, and the catalyst is dibutyl tin dilaurate, the amount of which is up to 0.05% of the total mass of the active ingredients in the raw materials.

4. A method of using the anti-fouling polyurethane film according to claim 1, comprising applying the anti-fouling polyurethane film to a substrate, thereby forming a self-cleaning coating layer on the substrate.

5. The method according to claim 4, characterized in that the substrate is glass, wood, metal, ceramics, leather, or a polymer substrate.

6. The method according to claim 4, characterized in that the substrate is an electronic display screen or a wearable sensor.

7. The anti-fouling polyurethane film according to claim 1, characterized in that the crosslinking monomer is trimethylolpropane.

* * * * *